J. F. COURSON.
DRAW GEAR APPARATUS.
APPLICATION FILED AUG. 6, 1908.
931,682.
Patented Aug. 17, 1909.
3 SHEETS—SHEET 2.
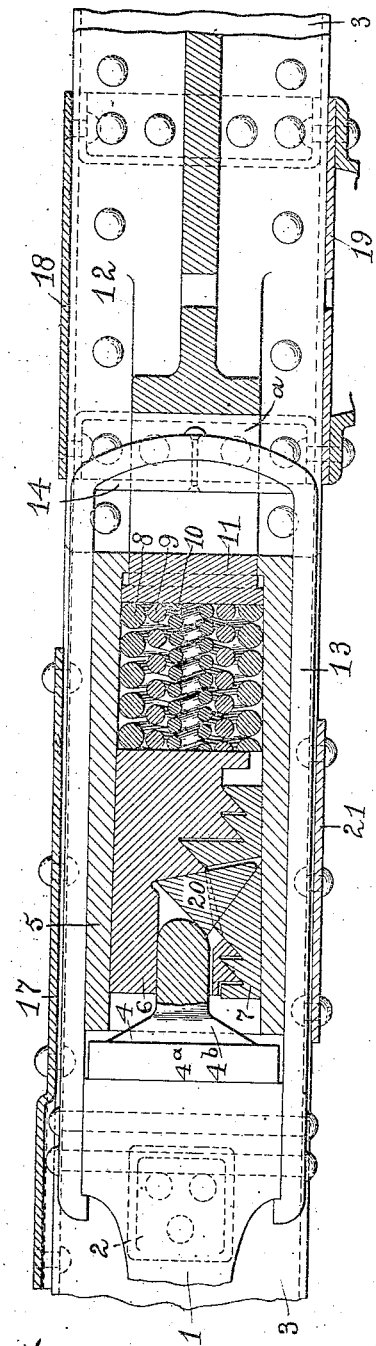
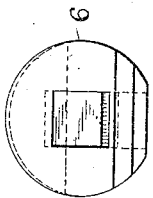
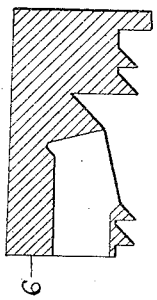
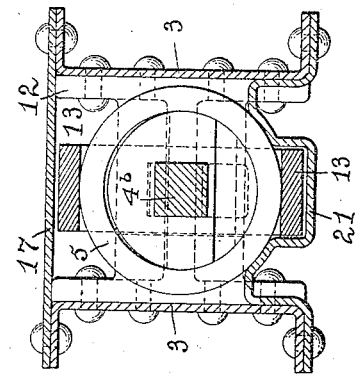

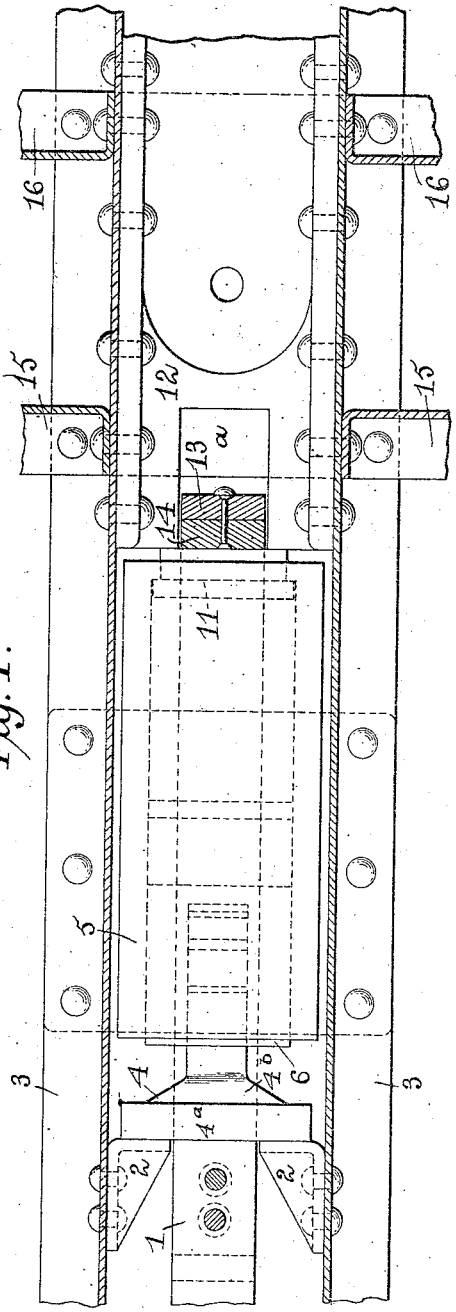
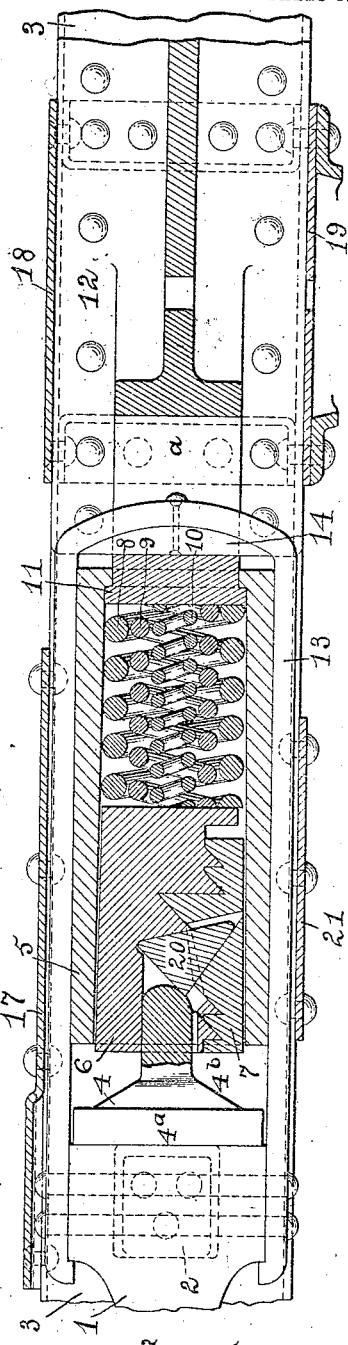

J. F. COURSON.
DRAW GEAR APPARATUS.
APPLICATION FILED AUG. 6, 1908.
931,682.
Patented Aug. 17, 1909.
3 SHEETS—SHEET 3.
Fig.6.  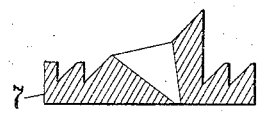  Fig.13.   Fig.6ª. 

Fig.10.

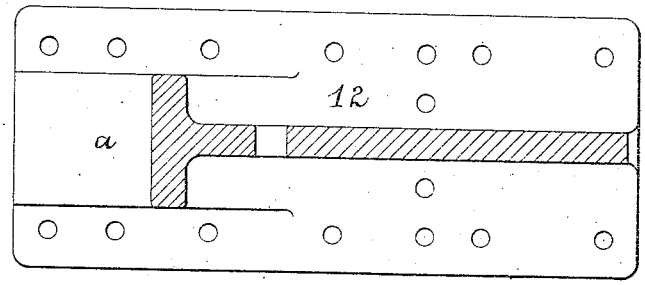
Fig.12.
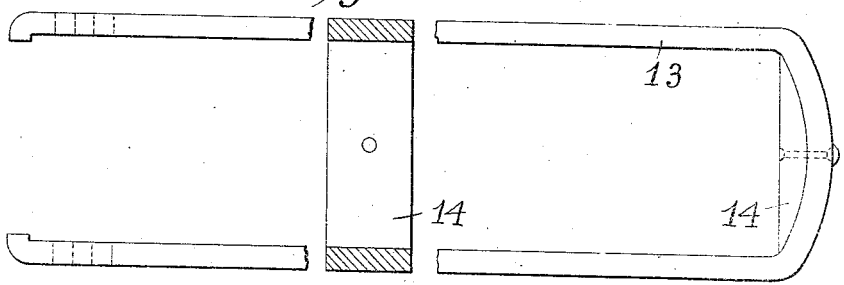
Attest:
Edw L. Folson
Benth. Stahl
Inventor:
John F. Courson
by Spear, Middleton, Donaldson & Spear
Attys.

UNITED STATES PATENT OFFICE.

JOHN F. COURSON, OF PITCAIRN, PENNSYLVANIA.

DRAW-GEAR APPARATUS.

No. 931,___.  Specification of Letters Patent.  Patented Aug. 17, 1909.

Application filed August 6, 1908. Serial No. 447,235.

*To all whom it may concern:*

Be it known that I, JOHN F. COURSON, a citizen of the United States, residing at Pitcairn, Pennsylvania, have invented certain new and useful Improvements in Draw-Gear Apparatus, of which the following is a specification.

My invention relates to draw gears for railway cars, and my object is to provide a draw gear of simple and economical construction which will be free from complication, capable of ready application, and which will be efficient in use.

The invention consists in the features and combination and arrangement of parts hereinafter described and particularly pointed out in the claims.

Figure 7:
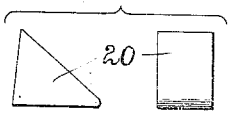
Figure 9:
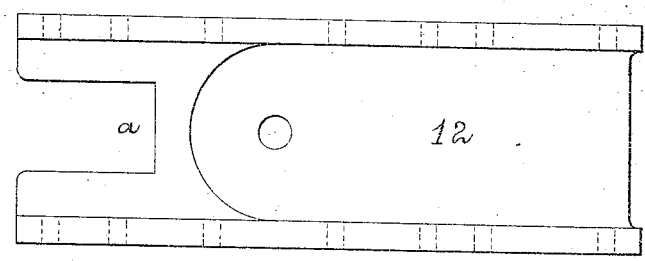
Figure 8:
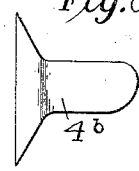
Figure 11:
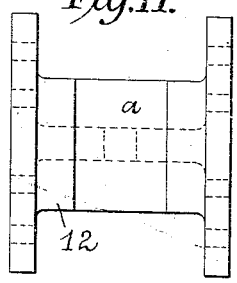

In the accompanying drawings,—Figure 1 is a plan view of the draw gear; Fig. 2 is a plan view showing a number of the parts in section and with the apparatus free from both buffing and pulling strains; Fig. 3 is a sectional plan view similar to Fig. 2 with the parts in a different position from that of Fig. 2; Fig. 4 is a cross sectional view through the apparatus; Fig. 5 is a sectional view of one of the friction blocks; Fig. 5ª is an end view of said block; Fig. 6 is a sectional view of the other friction block; Fig. 6ª is an end view of the friction block shown in Fig. 6; Fig. 7 shows two views of the wedge block; Fig. 8 is a detail view of the member which presses upon the wedge block; Fig. 9 is a detail plan view of a compound back stop and filling piece; Fig. 10 is a sectional view of said filling piece; Fig. 11 is a front view of said filling piece; Fig. 12 is a detail view of the yoke; Fig. 13 is a detail view of the back filling piece or follower for the draft gear.

In these drawings, 1 indicates the coupler shank; 2 the front stops consisting of angle iron pieces riveted to the car sills 3; 4 indicates a buffing device. This consists of a disk portion 4ª and a stem portion 4ᵇ; 5 indicates a cylinder arranged between the sills and containing therein a pair of friction blocks 6 and 7. In rear of these friction blocks are springs 8, 9 and 10 nested one within the other. In rear of the springs is arranged a filling piece or block 11, this having a head portion fitting within the cylinder and a stem portion extending rearwardly through an opening in the end of the cylinder. This stem bears at its rear end upon a back stop 12 which is arranged between the center sills 3 and acts not only as a back stop, but as a strengthening piece. This back stop is provided with an opening at $a$, and through this notch or opening the rear end of the yoke 13 extends. The end of this yoke is bolted or riveted to the coupler shank, while its rear end is provided with a back filling piece 14 against which the filling block 11 is adapted to bear. The back stop or strengthening piece 12 is securely riveted or bolted to the center sill.

15 and 16 indicate part of the body bolster.

At 17 is indicated an ordinary center sill cover plate for a steel car.

18 indicates the top section of the body bolster, and 19 the bottom section or plate.

21 indicates a plate fastened to the bottom of the center sills to hold the draft gear apparatus in place.

At 20 I show a wedge block which is arranged between the friction blocks 6 and 7. These friction blocks, it will be noted, are provided with interengaging projections, the faces of which are inclined so that the movement of one friction block in relation to the other in a direction longitudinally of the draft gear will result in a spreading action of the said friction blocks against the interior of the cylinder 5. This cylinder, it will be noted, is tapered on its interior toward the rear.

Figs. 2 and 3 show the different positions that the parts assume. Under either buffing or pulling strains the stem 4ᵇ of the buffing piece 4 will, by pressure upon the wedge block 20, cause this block in turn to press upon the friction blocks 6 and 7, and, by reason of the inclined contacting surfaces of the wedge block and the friction blocks, the said friction blocks will be forced apart and into frictional contact with the interior of the cylinder 5, and, as this cylinder tapers interiorly toward the rear, a strong frictional resistance will be afforded to absorb buffing and pulling strains. Of course the buffing and pulling strains are also absorbed by the springs arranged between the rear ends of the friction blocks and the filling piece 11. During light shocks or strains these are taken up by the filling piece 11 pressing upon the springs without the friction blocks coming into action, but if the strains or shocks become greater than would be absorbed by the springs, then the friction blocks come into action as a result of the pressure of the buffing stem 4ᵇ upon the wedge block 20. It will be observed that this wedge block has a trend of movement in a direction laterally of the draw gear and inclined to the axial line thereof. In buffing or pulling, the filling block 11 moves slightly into the cylinder, giving the spring the desired compression before the friction members act. Only one of the friction blocks bears upon the spring, and it receives all shock in buffing or pulling through the angular shaped wedge block. The wedge block 20, when pressed by the buffing stem 4ᵇ in a direction laterally and inclined to the axis of the draw gear, will, in pressing the friction blocks apart, force the friction block 6 toward the rear, while the friction block 7 will be forced toward the front, and in this position it serves to hold or lock the friction blocks until the shock is over, when the spring, reacting, will force the parts into their normal relative positions.

I do not limit myself to any particular form of angular piece or block 20 nor its precise combination and location between two friction blocks, as other arrangements of this loose wedge and locking block may be devised.

I do not limit myself to the number of wedge blocks which may be used, nor do I limit myself to forming the buffing stem 4ᵇ and its head or disk 4ᵃ of two pieces.

I claim as my invention:—

1. In combination in a draw gear, friction members, a wedge block extending at an inclination to and transversely of the axial line of the draft gear, said wedge block being interposed between the friction members, substantially as described.

2. In combination in a draw gear, a plurality of friction blocks, a wedge block having surfaces inclined to different degrees and extending at an inclination to and transversely of the axial line of the draft gear and interposed between the friction members with its inclines bearing thereon, with means for operating the said wedge block, substantially as described.

3. In combination in a draw gear, a plurality of friction members, a wedge block loosely interposed between them, and a buffing stem engaging the wedge block, said wedge block extending transversely of the line of draft, substantially as described.

4. In combination with a cylinder, friction means within the same, a buffing stem arranged axially of the cylinder and adapted to be operated by pressure from the coupler, a wedge block movable transversely of the line of draft and pressed upon by the stem, a yoke surrounding the cylinder and a filling piece bearing upon the yoke and extending into the cylinder to operate the resistance means, substantially as described.

5. In combination in apparatus of the class described, a plurality of friction blocks having interengaging portions with inclined faces, and a wedge block movable transversely of the line of draft and having inclined faces bearing upon inclined faces on the friction blocks to force them in opposite directions, both laterally and longitudinally, substantially as described.

6. In combination in a draw gear, friction means and a wedge block disposed as a whole at an inclination to the line of draft within the said friction means, and having opposite faces also inclined to the line of draft and bearing on corresponding inclines on the friction means substantially as described.

7. In combination in apparatus of the class described, a pair of friction blocks, a wedge block arranged between them and movable laterally of and inclined to the axial line of the draft gear, said wedge block having its inclined surfaces bearing on the inclined surfaces of the friction blocks and forcing them in opposite directions both laterally and longitudinally, and means for operating the wedge block, substantially as described.

8. In combination in a draw-gear, a pair of friction blocks, a triangular shaped block movable transversely of the line of draft for spreading said friction blocks and having each of its faces inclined to the line of draft, and means for transmitting the strains directly to one of the inclined faces of the said transversely movable block, substantially as described.

9. In combination in a draft gear, a pair of friction blocks, one having a recess extending transversely to the line of draft, and a wedge block arranged at an inclination to the line of draft and movable in a direction inclined to said draft line, said friction blocks having interengaging inclined surfaces, substantially as described.

10. In combination in a draft gear, a pair of friction blocks, one having a recess extending transversely of the line of draft, a wedge block arranged at an inclination to the line of draft and fitting in said recess, and each of the friction blocks having interengaging inclined faces on each side of the wedge block.

In testimony whereof, I affix my signature in presence of two witnesses.

JOHN F. COURSON.

Witnesses:
JOHN A. WILSON,
JAS. A. GROSS.